No. 690,770. Patented Jan. 7, 1902.
C. J. REED & M. T. MORRILL.
GALVANIC BATTERY OR PILE.
(Application filed July 6, 1899.)

(No Model.)

WITNESSES:
C. L. Belcher
Birney Hines

INVENTORS
Charles J. Reed
& Marcellus T. Morrill
BY
Wesley G. Carr
ATTORNEY.

UNITED STATES PATENT OFFICE.

CHARLES JOHN REED, OF PHILADELPHIA, PENNSYLVANIA, AND MARCELLUS THOMAS MORRILL, OF GOLDEN, COLORADO.

GALVANIC BATTERY OR PILE.

SPECIFICATION forming part of Letters Patent No. 690,770, dated January 7, 1902.

Application filed July 6, 1899. Serial No. 722,983. (No model.)

*To all whom it may concern:*

Be it known that we, CHARLES JOHN REED, residing at Philadelphia, in the county of Philadelphia and State of Pennsylvania, and MARCELLUS THOMAS MORRILL, residing at Golden, in the county of Jefferson and State of Colorado, citizens of the United States, have invented a new and useful Improvement in Galvanic Batteries or Piles, of which the following is a specification.

Our invention relates to the type of galvanic batteries known as the "dry pile," in which a number of cells or galvanic elements or couples are arranged in a single receptacle and electrically connected together in series.

The principal object of our invention is to provide means for securing a perfect insulation of each of the separate elements of the pile, whereby we are enabled to employ an electrolyte containing a large amount of moisture and having a large capacity and electromotive force without danger of local electrical action or of leakage of liquid between different parts of the pile.
A further object of our invention is to provide a pile which shall be simple and inexpensive in construction, as well as effective in operation and durable, and which may be compressed sufficiently to bring the parts into close contact without danger of injury to any of such parts.

Our invention is illustrated in the accompanying drawings, in which—

Figure 5:
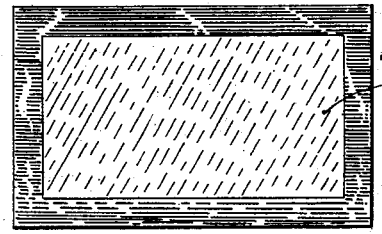
Figure 1:
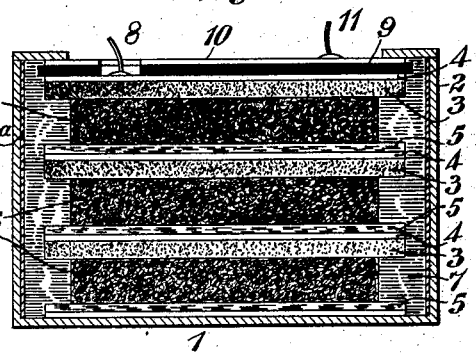
Figure 4:
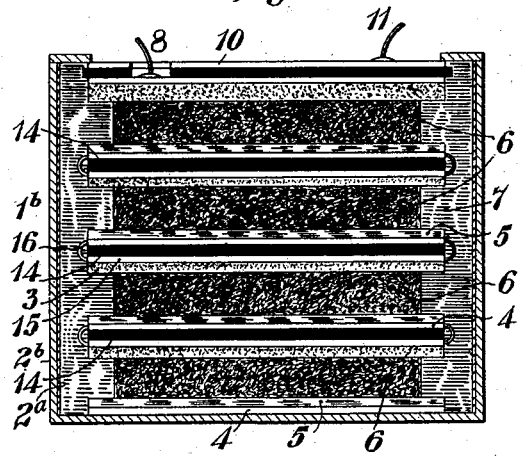
Figure 2:
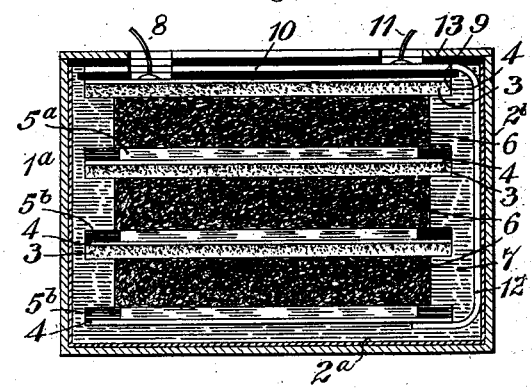
Figure 3:
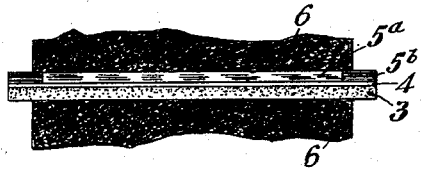

Figure 1 is a vertical section of one form of the pile, and Fig. 2 is a similar view of a slightly-modified construction. Figs. 3 and 4 are detail views of a portion of the pile and illustrate a modification of one of the parts. Fig. 5 is a sectional view corresponding to Figs. 1 and 2, but embodying a modification.

Referring now particularly to Fig. 1 of the drawings, the battery or pile 1 comprises a metal receptacle or casing 2, in which are located three galvanic elements or couples.
Our invention is, however, not limited as regards the number of such galvanic elements or couples, as will be readily understood. The negative electrodes 3 are in the form of flat plates or sheets of carbon or other suitable electronegative substance rendered impervious to water and saline solutions without interfering with their conductivity by being impregnated with wax, paraffin, rosin, pitch, or other suitable waterproof filling. Ordinary retort-carbon or battery-carbon may be used; but we prefer to employ a flexible electrode formed by mixing powdered or comminuted carbon, such as coke, with a small proportion of wax and then rolling the mixture into thin sheets, so as to bring the grains of carbon into contact with each other and to expose their outer surfaces in order to retain the conductivity of the plate as a whole and also to render it impervious to water and chemical solutions.

A flexible carbon which is impervious to water is extremely desirable by reason of the fact that great pressure may be applied to the pile to bring the elements into intimate contact without danger of causing leakage by breaking the carbon or by forcing the electrolyte through it and into contact with the zinc plate of the adjacent element.

We are aware that attempts have heretofore been made to use powdered carbon in the construction of piles; but such carbon does not prevent the passage of the electrolyte to the next element, and all such prior uses have been, so far as we are aware, of no practical value.

In close contact with one side of each carbon plate 3 is a plate 4 of zinc or other suitable electropositive metal. In contact with the zinc plate on the side opposite the carbon plate 3 is a plate or septum 5, of porous earthenware, paper, cloth, or other suitable material capable of absorbing water or saline solutions. The plates or sheets of carbon, zinc, and porous material we prefer to make of substantially equal length and breadth, and between each carbon plate and the adjacent porous septum we place a solid or nearly solid electrolytic mass of material 6, materially thicker, but of less length and breadth, than the plates 3, 4, and 5.

Our invention is not limited to any specific mixture of materials for the electrolytic bodies 6; but we prefer to employ a mixture of powdered coke, manganese dioxid, ammonium chlorid, and water. If this material were placed in contact with the zinc plates, local electrolytic action would take place between the solid constituents of the material and the zinc that would short-circuit the battery and quickly destroy the plates. The plates 5 serve to prevent such contact, but permit the liquid contained in the material 6 to pass through and act upon the zinc.

The battery or pile built up as described is placed in the receptacle 2, with the bottom zinc plate 4 in contact with the bottom of the receptacle, so that the latter constitutes one pole of the battery. We have shown the sides of the containing-receptacle 2 as provided with an insulating-lining $2^a$, of wood, paper, or other suitable material; but this is not essential and may be omitted, if desired. The entire space within the receptacle surrounding the battery elements is filled with wax, cement, or other suitable insulating material 7 in order to prevent water or solutions from passing around the edges of the plates, and thus short-circuiting the elements. By making the bodies of the mixture containing the chemically-active material of less length and breadth than the carbon and zinc plates we provide suitable recesses for the wax and insure a more perfect insulation.

The lead 8 from the zinc plate 4 of the top element is soldered to such plate and extends out through openings in the insulating-plate 9 just above the zinc plate and in the metal plate 10 above and resting upon such insulating-plate. The plate 10 is in contact with the receptacle or casing 2, and to it is soldered the other battery lead or terminal 11. Obviously this lead 11 might be attached to any part of the receptacle 2, since the latter is in contact with the zinc plate 4 and constitutes electrically a part of it.

Referring now to Fig. 2 of the drawings, the several parts are the same in construction and arrangement as those already described and are designated by the same reference-numerals, except as will be now specified. In this form of pile instead of making the receptacle $2^b$ one pole or terminal of the battery by placing the bottom zinc plate 4 in contact with it the said plate is connected to the metal plate 10 at the top by means of a suitable conductor 12, and between the plate 10 and the top of the receptacle is located an insulating-plate 13. The lead 11 is soldered or otherwise fastened to the plate 10 and extends out through openings in the plate 13 and in the top of the receptacle in case the latter extends completely over the battery elements. The lead or terminal 8, soldered to the top zinc plate 4, also extends out through registering openings in the several plates located above it. In this form of battery the entire receptacle may be provided, if desired, with an insulating-lining $2^a$, of wood, paper, or equivalent material, and the entire space at the bottom, as well as at the sides, is filled with the insulating wax or cement 7. After the several elements of the pile are assembled pressure is preferably applied vertically in order to bring the parts into more intimate contact, and the pile may then be inserted in the receptacle or it may be first dipped in melted wax to thoroughly and hermetically seal up the several couples in order to prevent any possibility of leakage or short-circuiting of the elements. After the pile has been inserted in the receptacle, whether it has been previously dipped in wax or not, the space surrounding it is completely filled with wax or other suitable cement, as already indicated.

In order to insure more perfect insulation of the separate elements, we find it desirable in some cases to impregnate the edges of the porous sheets 5 when dry with wax. This enables us to more easily and perfectly confine the moisture and electrolytic solutions within the spaces where they are to be utilized. In Figs. 3 and 4 we have shown a porous plate or septum $5^a$, the entire edge $5^b$ of which is impregnated with wax or other similar material for the purpose stated.

In Fig. 5 we have shown a battery or pile $1^b$, having a receptacle $2^b$, the sides of which are provided with a lining $2^a$, of paper, wood, or other suitable insulating material, and containing four battery elements or couples embedded in wax or other suitable insulating-cement 7 in the manner shown in Fig. 1 and already described. In this form of battery, however, the zinc plates 4 instead of being placed in contact with the carbon plates 3 are separated from them by plates 14 of insulating material, and in order to secure good electrical connection between the zinc plate of one element and the carbon plate of the adjacent element we locate between each insulating-plate 14 and the adjacent carbon plate 3 a plate 15, of tin or other suitable metal, which serves merely as a conductor and is electrically connected to the zinc plate in contact with the opposite side of the insulating-plate 14 by means of a wire 16 or other equivalent means—such, for example, as solder—or an edge or corner of either of the plates bent over, so as to bring the two plates into electrical contact beyond the edge of the insulating-plate 14. The insulating-plate 14 is employed in order to prevent the possibility of leakage from one element or cell to the next when the zinc plate has become punctured and partly eaten away by the chemical action of the cell. By employing the plates 15 a uniformly-good contact is secured with the carbon, and the resistance is reduced materially below what it would be without the employment of such plates.

We desire it to be understood that our invention is not limited to the specific forms and arrangement of parts shown and described, since many variations may be made without departing from the spirit and scope of our invention. For example, the plates may be circular, elliptical, or otherwise of different form from that shown, and the pile instead of being inclosed in a metallic or other receptacle may be simply embedded in a mass of waterproof wax or cement and held together by means of bolts, clamps, or bands or in any other suitable manner.

What we claim, and desire to secure by Letters Patent of the United States, is—

1. A galvanic battery or pile comprising a thin flexible, carbon-plate electrode, an electropositive-plate electrode, a body containing electrolytic material, and means for securely holding said parts in coöperative relation to each other, substantially as herein set forth.

2. A galvanic battery or pile composed of a number of elements in the form of sheets or layers superposed upon each other and connected in series, one of said sheets or layers being formed of flexible carbon and the entire pile being embedded in insulating-cement, substantially as herein set forth.

3. A galvanic element consisting of a carbon electrode, a zinc electrode, a porous septum of non-conducting material in contact with the zinc, and a porous body containing electrolytic material and located between the carbon electrode and the porous septum, said electrode and septum being of greater length and width than said body, substantially as herein set forth.

4. A galvanic element consisting of a carbon electrode, a zinc electrode, a porous septum of non-conducting material in contact with the zinc, and a porous body containing electrolytic material and located between the carbon electrode and the porous septum, said electrode and septum being of greater length and width than said body, all being embedded in insulating-cement, substantially as herein set forth.

5. A galvanic battery or pile composed of a number of elements connected in series, each element consisting of a carbon electrode, a zinc electrode, a porous septum of non-conducting material in contact with the zinc, and a porous body containing electrolytic material and located between the carbon electrode and the porous septum, said electrode and septum being of greater length and breadth than said body, all being embedded in insulating-cement, substantially as herein set forth.

6. A galvanic battery or pile consisting of two or more galvanic elements, the parts of which are in the form of flat plates, superimposed one upon another, all inclosed in a single metallic receptacle, the receptacle being electrically connected to one pole of the pile, but otherwise insulated from the pile by an insulating wax or cement, substantially as herein set forth.

7. A galvanic battery or pile consisting of two or more galvanic elements, the parts of which are in the form of flat plates, superimposed one upon another, and comprise flexible carbon electrodes, electropositive electrodes and an electrolyte, substantially as herein set forth.

8. A galvanic battery or pile consisting of two or more galvanic elements, the parts of which are in the form of flat plates, superimposed one upon another and comprise flexible electrodes of carbon impregnated with wax or equivalent waterproof cement, electropositive electrodes and an electrolyte, substantially as herein set forth.

9. A galvanic battery or pile consisting of two or more galvanic elements, the parts of which are in the form of flat plates, superimposed one upon another, and comprise flexible electrodes of carbon impregnated with wax or equivalent waterproof cement, the entire pile being embedded in wax or equivalent waterproof cement, substantially as herein set forth.

10. A galvanic battery or pile consisting of two or more galvanic elements, the parts of which are in the form of flat plates, superimposed one upon another, and comprise flexible electrodes of carbon impregnated with wax or equivalent waterproof cement, zinc electrodes, porous septa in contact with the zinc, and an electrolytic mixture of smaller area than the electrodes and located between the carbon electrode and the porous septum, substantially as herein set forth.

11. A galvanic battery or pile consisting of two or more galvanic elements, the parts of which are in the form of flat plates, superimposed one upon another, and comprise flexible electrodes of carbon impregnated with wax or equivalent waterproof cement, zinc electrodes, porous septa in contact with the zinc and an electrolytic mixture of smaller area than the electrodes and located between the carbon electrodes and the porous septa, all embedded in wax or equivalent waterproof cement, substantially as herein set forth.

12. A galvanic battery or pile consisting of two or more galvanic elements, the parts of which are in the form of flat plates, superimposed one upon another, and comprise flexible electrodes of carbon impregnated with wax or equivalent waterproof cement, zinc electrodes, porous septa in contact with the zinc, an electrolytic mixture of smaller area than the electrodes and located between the carbon electrodes and the porous septa, the entire periphery of each septum being impregnated with wax or equivalent waterproof cement, substantially as herein set forth.

13. A galvanic battery or pile consisting of two or more galvanic elements, the parts of which are in the form of flat plates, superimposed one upon another, and comprise flexible electrodes of carbon impregnated with wax or equivalent waterproof cement, zinc electrodes, porous septa in contact with the zinc, an electrolytic mixture of smaller area than the electrode and located between the carbon electrode and the porous septum, the entire periphery of each septum being impregnated with wax or equivalent waterproof cement, and all the parts being embedded in wax or equivalent waterproof cement, substantially as herein set forth.

14. A galvanic battery or pile consisting of two or more galvanic elements, electrically connected together in series, the parts of each element being in the form of flat plates superimposed one upon another, the negative electrode of one element being mechanically separated from the positive electrode of the adjacent element by an insulating plate or layer, and containing flexible electrodes of carbon impregnated with wax or equivalent waterproof cement, substantially as herein set forth.

15. A galvanic battery or pile consisting of two or more galvanic elements, the parts of which are in the form of flat plates, superimposed one upon another, which comprise flexible electrodes of carbon impregnated with wax or equivalent waterproof cement, all being inclosed in a single metallic receptacle, and the receptacle being electrically connected to one pole of the pile, but otherwise insulated from it, substantially as herein set forth.

16. A galvanic battery or pile consisting of two or more galvanic elements electrically connected in series, the parts of which are in the form of flat plates superimposed one upon another, and comprise carbon and zinc electrodes, porous septa in contact with the zinc, an electrolytic mixture of smaller area than the electrodes between the carbon electrodes and the porous septa, the negative electrode of one element being mechanically separated from the positive electrode of the adjacent element by an insulating plate or layer, substantially as herein set forth.

In testimony whereof I, the said CHARLES JOHN REED, have hereunto subscribed my name this 24th day of June, 1899.

CHARLES JOHN REED.

Witnesses:
ROBT. B. FLETCHER,
THOMAS B. SMITH.

In testimony whereof I, the said MARCELLUS THOMAS MORRILL, have hereunto subscribed my name this 27th day of June, 1899.

MARCELLUS THOMAS MORRILL.

Witnesses:
ROY A. HARTZELL,
ROYAL SORENSEN.